United States Patent [19]

Horton, III

[11] 4,201,414
[45] May 6, 1980

[54] CONSTRUCTION FOR THE INTERIOR OF A VAN OR TRUCK

[76] Inventor: John R. Horton, III, 5947 Boca Raton, Fort Worth, Tex. 76112

[21] Appl. No.: 865,992

[22] Filed: Dec. 30, 1977

[51] Int. Cl.² ............................................. B60P 3/34
[52] U.S. Cl. ................................ 296/169; 224/42.01; 296/174
[58] Field of Search .................... 296/3, 10, 23 R, 69, 296/23 F, 23 G, 23 H, 156, 169, 170, 174; 224/42.01, 42.32

[56] References Cited

U.S. PATENT DOCUMENTS

| | | | |
|---|---|---|---|
| 2,701,393 | 2/1955 | Madsen | 296/23 R |
| 3,078,117 | 2/1963 | Martini | 296/23 H |
| 3,393,936 | 7/1968 | Hall | 296/24 R |
| 3,727,970 | 4/1973 | Delmage | 296/69 |
| 3,880,458 | 4/1975 | Jackson | 296/23 G |
| 3,910,626 | 10/1975 | Hobbensiefken | 296/69 |

Primary Examiner—Robert R. Song
Assistant Examiner—John A. Carroll
Attorney, Agent, or Firm—Charles W. McHugh

[57] ABSTRACT

A construction for the interior of a vehicle such as a van or truck, including a pair of fixed side cabinets in the cargo area of the vehicle's interior. The cabinets are anchored to the vehicle's chassis, so as to provide a structural extension of the chassis. A movable deck has a width such that it extends between the right and left cabinets with relatively small clearance. The movable deck has a lower position in which it is adapted to rest directly on top of the vehicle's floor; and it has an elevated position in which it lies in a plane which is above and generally parallel to the vehicle's floor. Cooperating structural parts (such as bolts and mating apertures) are provided for holding the deck at a position where it is fixed against both vertical and horizontal movement. Additionally, rotatable plates may be affixed to the bottom of the deck at its forward and rear end, so that the plates may carry at least some vertical loads when the deck is in its elevated position. The construction is particularly applicable for customizing vans so that they may be readily switched from a cargo-carrying mode to a configuration more commonly associated with recreation vehicles—including a wide platform which serves as a bench, bed, etc.

1 Claim, 10 Drawing Figures

CONSTRUCTION FOR THE INTERIOR OF A VAN OR TRUCK

This invention relates generally to a construction for the cargo area of a vehicle such as a truck or van, and more particularly it relates to a construction wherein a horizontal platform is easily movable at will from a first elevation to another elevation.

A recent phenomenon has occurred in the United States involving the relatively wide-spread acceptance and appeal of vans for use as recreational vehicles and so-called "family" vehicles by a large segment of the population. Such vans (which are significantly larger than the well-known "stationwagon") apparently have at least some appeal because they are large enough to permit the creation of a customized interior which may include options such as a refrigerator, a bed, a wet bar, a multi-speaker stereo system, cabinets, chairs, benches, plush carpets, special lighting fixtures, etc. Other than the amount of money that a customer wishes to invest in a customized van, the only limit to embellishing a vehicle's interior appears to be available space; and, it is not unusual to hear of customized vans costing more than twice as much as the "base sticker price" for a bare vehicle with only modest options.

Regrettably, though, after a person has invested several thousands of dollars in customizing the interior of a van, he frequently has added built-in features (like a bed or benches) which thereafter restrict the use of the an to essentially non-cargo use. That is, if the van owner wished to have the advantage of a built-in platform which 8with a suitable mattress or cushions thereon) could be categorized as a "bed", then such a large portion of the vehicle's interior had thereby been dedicated to the bed that the van could no longer carry bulky objects as large as those which would be carried when the van was stripped. Thus, in times past, the owner of the vehicle was often faced with the choice of having a built-in bed or preserving the load-carry properties of the original vehicle.

It will be appreciated, therefore, that a need has existed for some way to provide the advantages of having a recreational van with a built-in bed and other appurtenances, while still having the load-carrying capacity of a utility truck whenever the vehicle is being used for hauling or the like. In other words, there has been a need for a construction for a vehicle's interior which would permit the vehicle's use during certain periods as a hauling vehicle—while permitting its ready conversion to a recreation vehicle for weekend trips and the like. It is an object of this invention, therefore, to provide a construction which is readily convertible between a cargo-carrying mode and an alternate, "recreation" mode. Specifically, it is an object of this invention to provide a movable deck having a size which is approrpriate for forming a bed upon which persons might sit or sleep while the deck is elevated, and which deck may be lowered to a position immediately next to the floor when it is desirable to carry as much cargo in the vehicle as is possible.

In brief, these and other objects are met by providing a pair of fixed side structures such as cabinets in the vehicle's cargo area, with one of said pair being on the vehicle's right side and the other being on the vehicle's left side. Both of the side structures are securely anchored to the vehicle's chassis, so as to form a structurally "fixed" base. Extending between the two side structures is a movable deck whose width is such that it may move up and down between the side structures with relatively small clearance, and having a length to foster comfortable sleeping by an adult, e.g., 5 to 8 feet. The movable deck has an elevated position in which it lies in a plane which is above and generally parallel to the vehicle's floor, with the height of the movable deck being about the same as a typical bench or seat. The movable deck also has a lowered position in which it is adapted to rest in load-bearing relationship directly on top of the vehicle's floor. Suitable structural members are provided for holding the movable deck securely in either its elevated position or its lowered position.

The invention will be more fully appreciated and understood following a thorough reading of the specification and claims thereto, including reference to the attached drawings wherein FIG. 1 is an essentially perspective view of the cargo-carrying (or rear) portion of the interior of a van-type vehicle, including two fixed side cabinets and a movable deck therebetween. The side cabinets are fixed to the chassis and adjacent opposite sides of the vehicle; and the deck is shown in its lowered position where it can be in direct, load-bearing relation to the floor of the vehicle.

Figure 1:
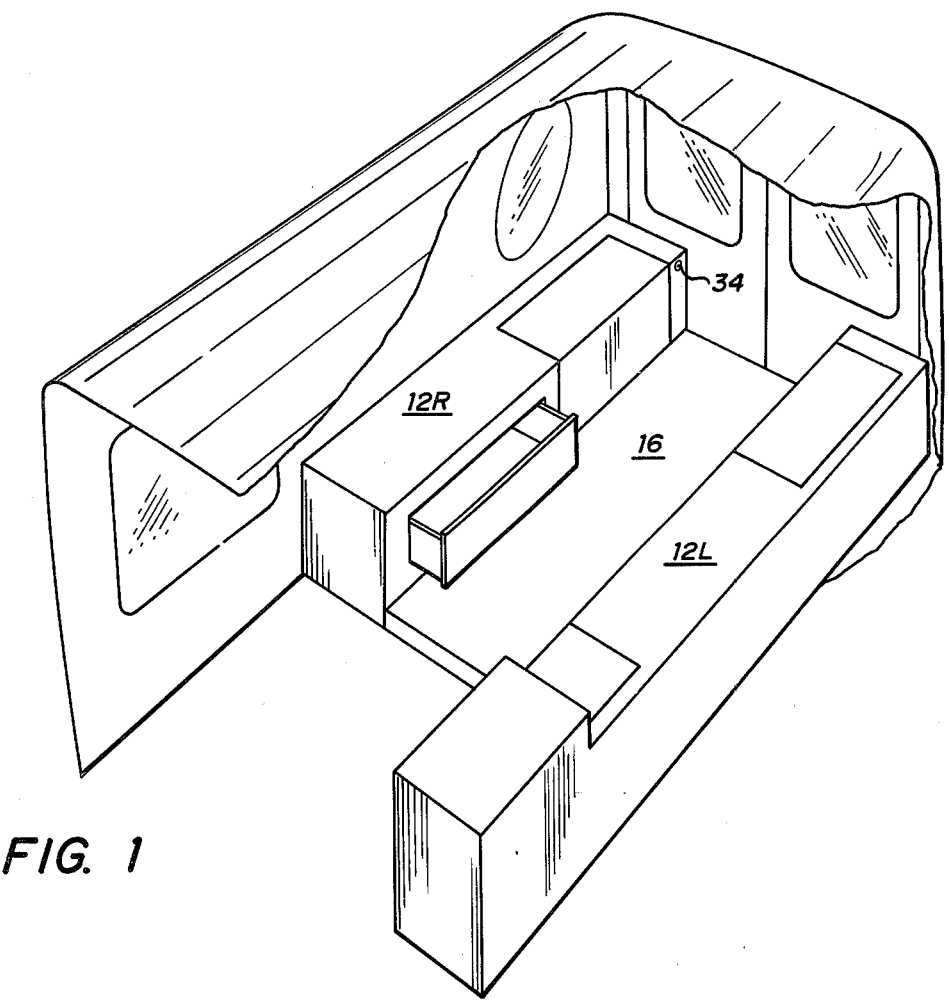
Figure 2:
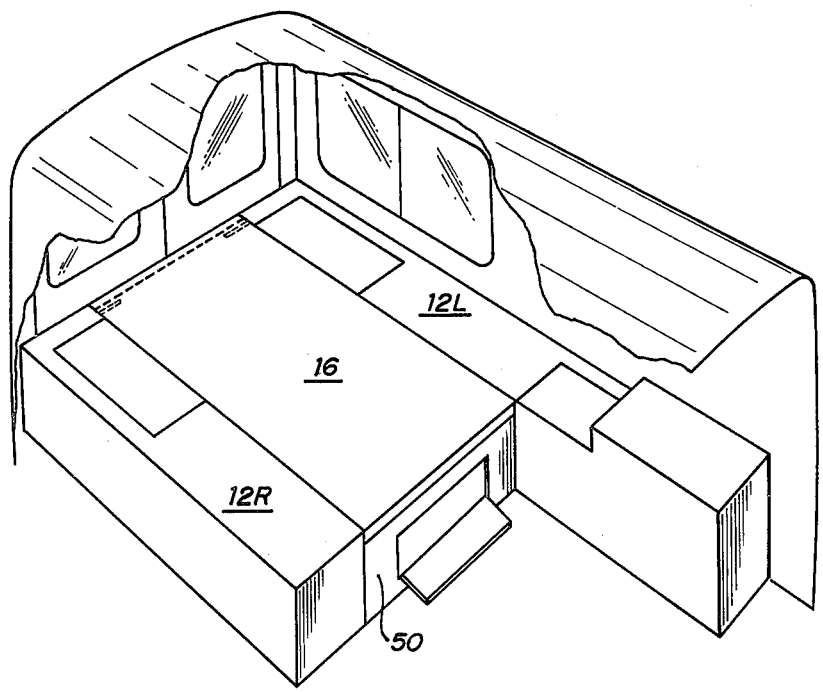
FIG. 2 is an essentially perspective view of a portion of a vehicle's interior wherein the movable deck is in its elevated position between the two fixed side cabinets, such that an essentially continuous surface is formed by the cabinets and the deck from one side of the vehicle to the other side thereof.

Referring initially to FIG. 1, a construction for the interior of a vehicle 10 such as a truck or van includes a pair of fixed side cabinets 12R, 12L which are mounted in the cargo area of the vehicle's interior. Side cabinets 12R, 12L are fixed with approprite hardware (not shown) to a structural member of the vehicle, such that they form an effective structural extension of the vehicle's chassis. The cabinets 12R, 12L need not be permanently immobile, however, as long as they have a skeleton or foundation which may be securely fixed to the chassis. While the cabinets have an important structural function, as will be more clearly described hereinafter, they also offer an excellent opportunity for concealed storage when appropriate access doors or hinged panels are provided therein. The height of side cabinets 12R, 12L is largely a matter of choice, although it is particularly advantageous to establish a height of about 15 inches above the floor of the vehicle. With such a height, the cabinets can serve as a bench upon which a person might comfortably sit when the vehicle is in what will be called its cargo-carrying mode. However, this preferred height of about 15 inches need not be maintained for the full length of the cabinet; and, after sufficient length (e.g., eight feet) has been provided to form at least a portion of a "bed" area, then a substantially higher or lower cabinet height may be established to suit individual tastes or space requirements for specialized equipment, etc.

As for the position of the side cabinets 12R, 12L within the vehicle, it is more logical to put them near the rear of the customary cargo area, where they may encompass and enclose the rear wheel well which typically extends upward into the cargo area. Also, by placing the cabinets near the rear, there is more room left toward the front of the vehicle to foster its use as a recreation vehicle.

Provided between the two side cabinets 12R, 12L is a movable deck 16 which has a width such that it extends between the right and left cabinets with relatively small clearance, e.g., ⅛ inch or so. The movable deck 16 has two normal rest positions: a lower position in which it is adapted to rest directly on top of the vehicle's floor, and an elevated position in which it lies in a plane which is above and generally parallel to the vehicle's floor. Preferably, the top of the deck 16 (when it is in its elevated position) is approximately flush with the top of the side cabinets 12R, 12L. In such a case, a planar and substantially continuous surface is provided from one cabinet across to the other when the deck is elevated. Then, if a set of cushions or the like is placed on top of the deck and cabinets, a relatively wide bed for reclining or sleeping is provided within the vehicle—from one side wall to the other. Of course, even in this mode, cargo and the like can be placed on top of (or under) the deck; so, by referring to the lowered position of the deck as corresponding to the "cargo-carrying mode", it is not thereby intended to negate the transporting of cargo when the deck is raised. Rather, the description of the lowered deck position as constituting the "cargo-carrying" condition of the vehicle is merely acknowledging the fact that the size of a piece of cargo which a person might wish to carry is maximized when the deck is low.

Figure 3:
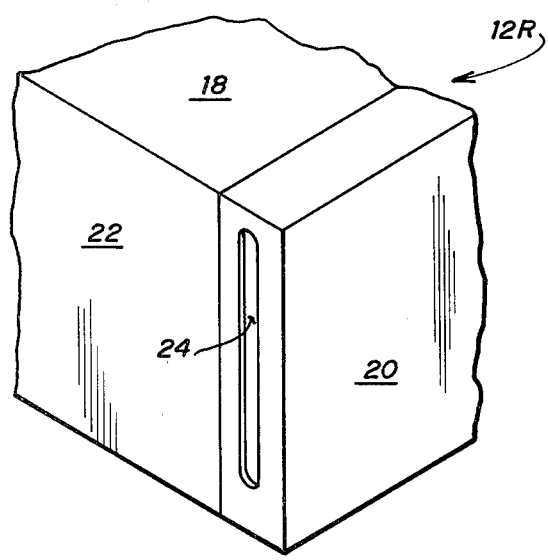
FIG. 3 is a fragmentary perspective view of the rear portion of a right side cabinet, said view being taken from a direction looking into the vertical groove which accepts a mating pin mounted on the deck.
Figure 4:
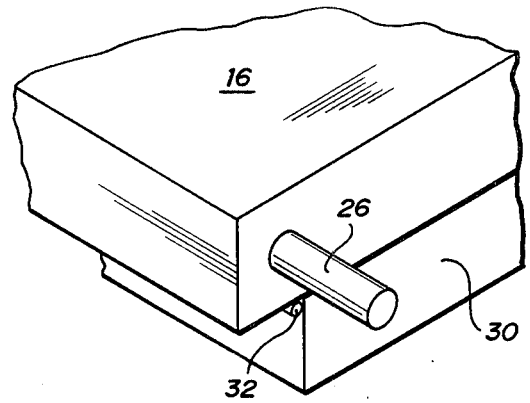
FIG. 4 is a fragmentary perspective view of the rear cover plate folded underneath the movable deck, this being the position which the plate occupies when the deck is in its lowered state.
Figure 5:
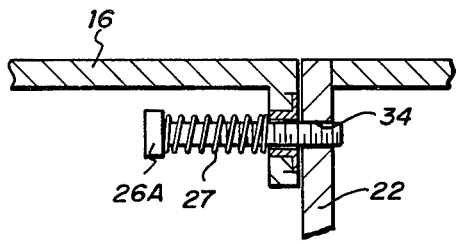
FIG. 5 is a fragmentary, cross-sectional view of a rear corner of the movable deck, showing a threaded pin mounted on the deck by virtue of a nut fixed to said deck, and the pin being axially movable with respect to an aperture in the face of a fixed side cabinet.

Having identified the upper and lower positions for the movable deck 16, it is now appropriate to refer to FIGS. 3 and 4, which illustrate the cooperating parts on a movable deck and a side cabinet which selectively hold the deck in its rest positions above the vehicle floor. Referring initially to FIG. 3, a right side cabinet 12R has an end panel 20 at its end which is closest to the rear door, a top 18 and a side 22. Provided in the side 22 is a vertical slot or deep groove 24 having a width which is established to provide only modest clearance for a mating piece which is fixed to the movable deck 16. The slot 24 will extend almost the full height of the cabinet 12R, with the amount of material which is left at the ends of the slot being established primarily in accordance with the thickness of the movable deck 16.

Referring next to FIG. 4, the right, rear corner of the movable deck 16 is shown, with an elongated structural piece 26 (such as a bolt) protruding sidewardly out of the deck—for a distance sufficient to mate with and be held by its associated slot 24. In this particular embodiment, the structural member 26 is just barely narrower than the groove 24, such that the deck 16 is essentially fixed against horizontal movement when the elements 24, 26 are engaged. The bolt or pin 26 is designed to move up and down in the groove 24, but not in a direction parallel to the longitudinal axis of the vehicle.

Attached to the rear end of the movable deck 16 is a cover plate 30 which is hingedly connected to said deck by hinges 32. When the deck 16 is moved to its elevated position, the cover plate 30 is adapted to hang vertically below the deck, and—when the weight of the deck is placed on the cover plate—to support the same. That is, it is preferred that the weight of the deck and anything on top of it be carried by the cover plate 30 rather than the two pins 26. In this manner, the pins 26 are less likely to be bent, and the structural integrity of the deck (in the region where the pin 26 passes through the deck) is less likely to be weakened. Of course, when the movable deck 16 is to be lowered to its position immediately adjacent the vehicle floor, the cover plate 30 will be folded underneath the movable deck as shown in FIG. 4. Any cargo that is placed on top of the deck 16 while it is in its folded position will be transferred to the vehicle's floor through a relatively wide area which is equal (at the rear end of the deck) to the area of the cover plate 30. Also, hinges 32 are preferably selected and positioned so that they do not carry any vertical loads between the deck 16 and the vehicle's floor when the end plate 30 is folded so as to be parallel to the deck.

Figure 6:
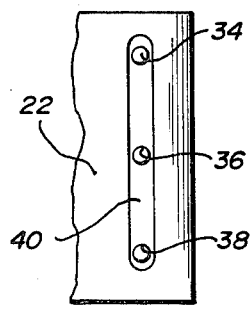
FIG. 6 is an elevational view of a fragmentary portion of a right side cabinet in a vehicle, showing a plurality of apertures which are adapted for locking a movable deck to the side cabinet at a desired height.

In another embodiment of the rear structural arrangement, a rear cover plate 30 is omitted; and structural members 26A are spring-loaded so as to retract axially within the deck 16 at appropriate times for a distance sufficient to clear an aperture 34 which is provided in side 22. At least one aperture 34 must be provided in such an embodiment, and two or more apertures may be arranged vertically so as to serve a function similar to groove 24. In FIG. 6, the aperture 34 at the top of the wall 22 will securely hold the movable deck 16 in its elevated position when engaged by pin 26A—so that it is held against both vertical and horizontal movement. Manually retracting the pin 26A will allow the deck 16 some freedom of movement, and it can be lowered to a position so that pin 26A can engage another aperture, such as aperture 36 or 38. Spring 27 constantly urges pin 26A outward, so that it will automatically engage any aperture which is in alignment with the pin, thereby locking the deck 16 to the vehicle's chassis at a new elevation. Of course, in this embodiment, the pair of pins 26A must carry both vertical and horizontal loads, and they usual'y will be stronger than the earlier-described pins 26 which carry only such horizontal loads to which the deck may be subjected. In order to insure that the pins 26A do not experience any difficulty in becoming aligned with one of the apertures 34, 36, 38, it is advantageous to provide a shallow guide or channel 40 which is sufficiently deep to restrain pin 26A against horizontal movement during shifting of the deck 16, but will have no effect with regard to vertical movement of the deck 16.

Figure 7:
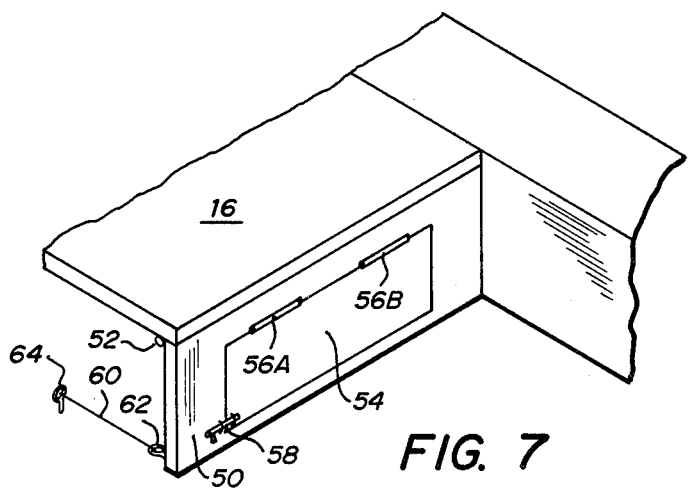
FIG. 7 is an essentially perspective view of a portion of the movable deck, showing the pivotable front plate in its vertical, load-supporting position below the movable deck.

Turning next to FIG. 7, the front end of the movable deck 16 is supported at a level such that the deck is substantially horizontal by virtue of a foldable front wall or plate 50 which is preferably connected (permanently) to the forward end of the deck by hinge 52. Ideally, the rectangular plate 50 has a height such that the top of the deck 16 is substantially flush with the top of the side cabinets 12R, L when the plate 50 is rotated into its vertical mode. The front plate 50, as well as the deck 16, the rear plate 30, etc. may be advantageously made from plywood or the like, so as to have an advantageous strength-to-weight ratio. And, it is preferred that the relative position of the deck 16 and the front plate 50 be such that vertical loads are passed directly between abutting surfaces of the two elements, so that only minor vertical loads are carried by the hinge means 52. In this way, strain on the hinge means 52 is minimized, and a longer life is assured for any fasteners which may be employed on said hinge means, etc. A front access door 54 is also provided in the front wall 50, with hinges 56A, 56B being mounted such that a person could have access to any things which were stored in deck 16 while it is in its elevated position. A latch 58 preferably secures the door 54 against unwanted pivoting with respect to front plate 50.

Also illustrated in FIG. 7 is an auxiliary means for insuring stability of deck 16 in its elevated position, namely, a flexible cord 60 which is secured at one end to an eye-bolt 62 on the front panel 50 and secured at its other end to an eye-bolt 64 which is connected to some anchor. If desired, the eye-bolt 64 may be affixed to a side cabinet 12R or the vehicle's chasis, etc.; or the eye-bolt 64 may even be secured to the underside of the deck 16, as long as the cord 60 has a length which is sufficient to permit front plate 50 to selectively rotate downward with respect to deck 16 so that it is substantially vertical.

Figure 8A:
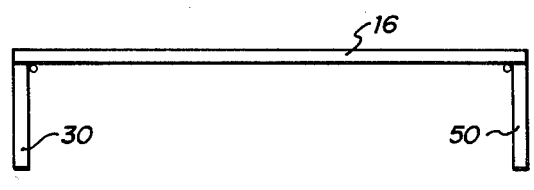
FIG. 8A is a schematic showing of the movable deck and two pivotable support members, both of which are in their vertical positions below the deck.
Figure 8B:
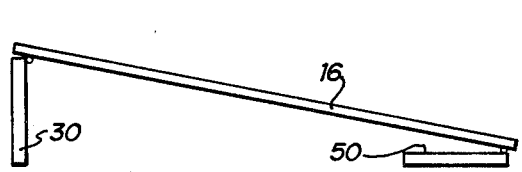
FIG. 8B is a schematic showing of the relative positions of the movable deck and its support members, with the deck being in an intermediate position between the fully lowered and fully raised positions.

Referring next to FIG. 8, the sequence of events involved in transposing the deck 16 from its elevated position to its lowered position will be described. First, a person should prudently verify that all stored goods have been removed from beneath the deck 16. Then, the front end plate 50 should be rotated backward (clockwise in FIG. 8B) through an angle of about 90 degrees, thereby allowing the front end of deck 16 to fall downward until the outer face of plate 50 comes into contact with the vehicle's floor. This is a very simple maneuver, and no great strength is required on the part of the person who is making this switch in the deck position. Also, even though the deck in FIG. 8B is not necessarily an ideal position for storing many things, it is a stable position—to the extent that it can be left there indefinitely without any risk of danger to itself or any other structure (or people). This is because the pins or bolts 26 are still securely engaged with the mating groove 24, preventing forward or rearward movement of the deck; furthermore, the top of groove 24 prevents the deck 16 from moving upward, and the rear cover plate 30 prevents the rear end of deck 16 from moving downward. Hence, with the rear of deck 16 being firmly held in place, the deck is certainly in a condition which may be accurately described as stable.

The next step in lowering the deck 16 is to walk to the rear of the vehicle and (typically through opened rear doors) rotate the rear cover plate 30 inward slowly, allowing the rear end of deck 16 to gradually fall. In doing this, it will be necessary to let the deck 16 move forward a small amount because the pin 26 is constrained to move vertically in groove 24. The small amount of forward movement of deck 16 actually has a beneficial affect in slowing the decline of deck 16, by virtue of a slight dragging force between the face of plate 50 and the vehicle's floor. Because the transition between an elevated position and a lowered position is relatively gradual, there is little likelihood of a person getting his fingers caught in a position where they are pinched by an spring-biased member. That is, there are no dangerous linkages, etc., which might pose a risk to the fingers of a careless person.

Figure 8C:
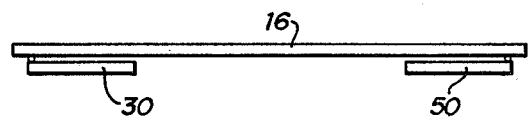
FIG. 8C is a schematic showing of the deck and its two support members, with the deck being in its lowered position.

When it is desired to move the deck 16 from its collapsed position shown in FIG. 8C, the procedure followed in lowering the deck is simply reversed. And, another advantage of the simplified restraining means shown herein is that the deck 16 could actually be initially elevated at either end. That is, if it is more convenient to lift the front end first, the degree of freedom of the construction shown herein will readily permit this to be done—without risking damage to any hardware that may be used to hold the construction intact. When the deck 16 has been lowered so that it lies immediately next to the vehicle's floor, the deck is capable of supporting substantial loads—because said loads will be transferred to the vehicle's floor through the relatively wide panels 30, 50. Indeed, it would be possible to place a relatively heavy and bulky item such as a motorcycle on top of a lowered deck (preferably after placing a suitable tarp or the like on top of the deck—for cleanliness). But, if the load-carrying space in the van was still not as much as desired, the entire deck 16 could be removed from the van, so that a few more inches of clearance would be available. Alternatively, the deck 16 could be removed from its connection with the fixed side cabinets 12R, L and simply stored vertically (on a temporary basis) within the van. Such a folded and temporarily stored deck 16 would occupy relatively little space; and it would be promptly available to serve as a bed, etc., when the vehicle has arrived at a camp site or the like.

The locations of storage areas within the side cabinets 12R, L are largely a matter of choice; and the wheel well positions in a respective vehicle will likely influence a person's placement of the drawers, doors, etc., which define the storage areas. In general, though, the storage areas and their respective access doors will be selected so that the areas are accessible when the deck is in its lowered position but concealed when the deck is in its elevated position. One particularly advantabeous design includes an elongated hinge placed along a substantial portion of the cabinet top 18 (adjacent the vehicle's sidewall), so that the hinged portion of the top may be rotated upwardly and toward the vehicle's wall. A substantial portion of the face 22 would be similarly hinged to the top 18 along the inside edge of the top, and the face would come to rest alongside and parallel to the top when said top is raised. This will permit essentially unlimited access to those things stored below the top 18 without requiring individual access doors, etc. Covering the cabinets and top of the deck with thick floor carpet (if the vehicle is a van) will help conceal the exact location of any hinges or fold lines. If the vehicle is a pickup truck or the like, the possible exposure to weather elements may dictate a slightly different way of cosmetically dressing the construction disclosed herein; but it should not affect the basis upon which is founded the technical concept of the multi-position deck.

While only the preferred embodiments of the invention have been disclosed herein in great detail, it should be apparent to those skilled in the art that modifications thereof may be accomplished without departing from the spirit and scope of the invention. For example, the bottom aperture 38 shown in FIG. 6 may be omitted and the recess 40 terminated at a higher elevation, such that the deck 16 will be restrained from movement only by gravity when it is in its lower position; in such an embodiment, the deck 16 may be slidingly removed from the vehicle (out the rear doors) when the deck is in its lower position. Also, whether the rotatable plates 30, 50 extend all the way from one side cabinet to the other may be occasionally varied to suit individual tastes and the special needs of a particular customizing job, etc. Furthermore, a certain amount of flexibility is possible in selecting the relative positions of the bolts 26, 26A and their associated apertures, grooves, etc.; in a particular situation it may even be advantageous to reverse the placement of the bolts and put them on the side cabinets rather than the movable deck. Also, the thickness of the deck 16, and whether it is solid or at least partially hollow, are deemed to be matters of choice and within the concept of the invention. These and other modifications and variations should therefore be deemed to fall within the scope of the claims appended hereto.

What is claimed is:

1. A construction for the interior of a vehicle such as a truck or van, comprising:
   (a) a pair of fixed side cabinets in the cargo area of the vehicle's interior, with one of said pair being on the right side and the other being on the left side of the vehicle, and said cabinets being anchored to the vehicle's chassis;
   (b) a movable deck having a width such that it extends between the right and left cabinets with relatively small clearance, with said deck having a lower position in which it is adapted to rest directly on top of the vehicle's floor, and said deck having an elevated position in which it lies in a plane which is above and generally parallel to the vehicle's floor, with the elevated position of the movable deck being vertically above the lower position of the movable deck, whereby the longitudinal relationship between the movable deck and the vehicle is the same in both the elevated and lower modes; and
   (c) means for selectively holding the deck in its elevated position above the floor, including a pair of spaced structural members at opposite sides of the deck for holding a first end of the deck at a position where the deck is fixed against both vertical and horizontal movement, and said means further including a pivotable member for selectively supporting the second end of the deck at the same height above the floor as the first end, and wherein said pair of structural members for holding a first end of the deck constitute a pair of bolts removably fixed to the respective sides of said deck, and there being a plurality of pairs of mating recesses in said side cabinets for receiving a protruding end of said bolts and holding said bolts against vertical movement when the deck is fully elevated, and said recesses also holding said protruding bolts against movement in a direction parallel to the longitudinal axis of the vehicle, and the recesses on a respective side cabinet being surrounded by a common groove for restricting longitudinal movement of said bolt as said bolt is being moved from one recess to another.

* * * * *